United States Patent

Hansen

[15] 3,689,746
[45] Sept. 5, 1972

[54] METHOD FOR MEASUREMENT OF SCATTER AND ABSORPTION OF LIGHT

[72] Inventor: Dale H. Hansen, 6442 Langford Circle, Huntington Beach, Calif. 92647

[22] Filed: Oct. 19, 1970

[21] Appl. No.: 81,660

[52] U.S. Cl............235/151.3, 73/432 R, 346/33 A, 350/320, 356/201
[51] Int. Cl............................................G01m 11/02
[58] Field of Search ......356/201, 209; 350/101, 320; 73/432, 432 R; 235/151.3; 346/76, 33 A

[56] References Cited

OTHER PUBLICATIONS (599100001) Norbury, A. H. " Reflectance Spectroscopy and its Applications" In Lab. Pract. 18(7): p. 754–9, July 1969

(500450008) Mallett, J. F. W. et al. " A Logarithmic Analog to Digital Converter Used for Optical Density," Measurements in Sci. Instrum. 3(3): Mar. 1970

*Primary Examiner*—Eugene G. Botz
*Assistant Examiner*—R. Stephen Didine, Jr.
*Attorney*—Nienow & Frater

[57] ABSTRACT

The transmission, reflectivity, and loss characteristics of mirrors is determined by a method and apparatus employing several mirrors whose transmission characteristics are measured individually and in series. The use of a pair of like mirrors simplifies the method and minimizes the amount of computer time needed to conduct the process for determining mirror reflectivity and loss. The absorbed component of total loss is found by determining loss at zero spacing of a pair of mirrors by extrapolation from measurements made when the mirrors were spaced. For the most part, the method is arranged so that the computations may be made by hand rather than by computer, if desired.

10 Claims, 14 Drawing Figures

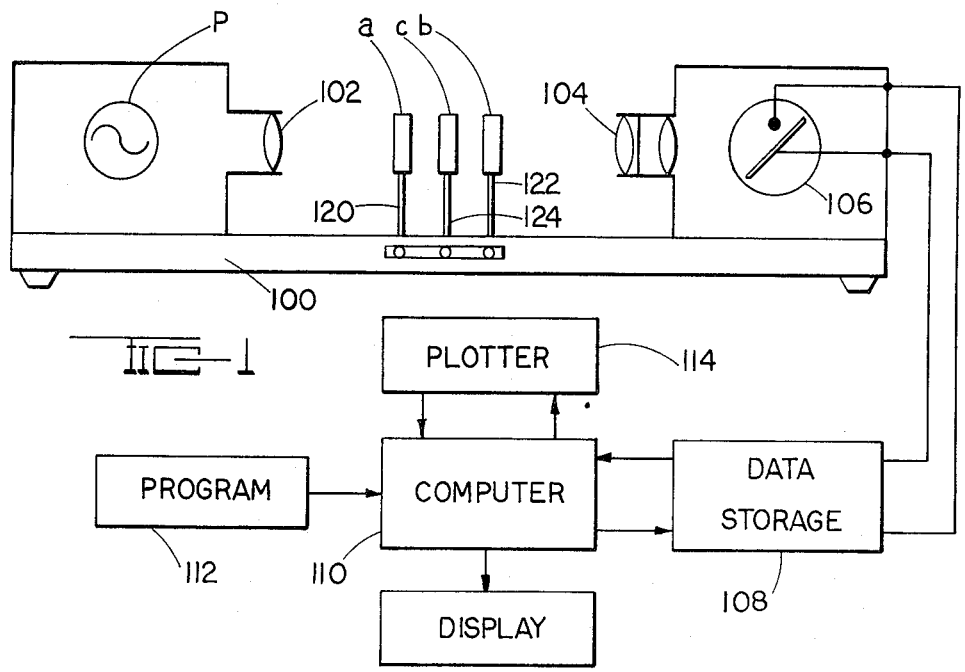
FIG—1
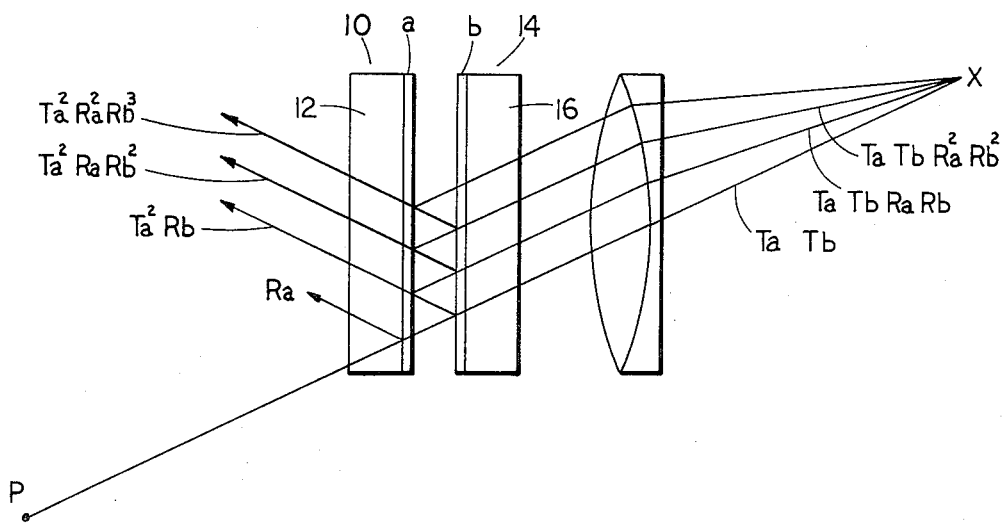
FIG—2
INVENTOR
DALE H. HANSEN
BY
Nienow & Frater
ATTORNEYS INVENTOR
DALE H. HANSEN
BY
*Niverow & Frater*
ATTORNEYS

FIG. 6

SOLUTION PROGRAM 100

$$\alpha_{ave} = 1 - \sqrt{T_1 T_2} - \sqrt{1 - \frac{T_1 T_2}{T_{12}}}$$

FIG. 7

SOLUTION PROGRAM 200

$$\alpha_1 = \alpha_2 = \alpha_{ave}$$

$$R_1 = 1 - T_1 - \alpha_1$$

FIG. 8

SOLUTION PROGRAM 300

$$\alpha_{120} = 1 - \sqrt{T_1 T_2} - \sqrt{1 - T_1 T_2 / T_{120}}$$

$$\alpha_{10} = \alpha_{20} = \alpha_{120}$$

FIG. 9

SOLUTION PROGRAM 400

$$\alpha_{1S} = \alpha_1 - \alpha_{1o}$$

FIG. 10

SOLUTION PROGRAM 500

$$2\alpha_{12} = \alpha_1 + \alpha_2 \quad (1)$$

$$2\alpha_{13} = \alpha_1 + \alpha_3 \quad (2)$$

$$2\alpha_{23} = \alpha_2 + \alpha_3 \quad (3)$$

FIG. 11

SOLUTION PROGRAM 600

$$\alpha_3 = \left\{ \left[ \frac{T - \left(\frac{T_1 T_2 T_3}{1 - T_3^2 R_1 R_2}\right)}{T + (T_1 T_2 T_3)} \right] \left[ \frac{1}{R_1 + R_2} \right] \right\} T_3 - 1$$

INVENTOR

DALE H. HANSEN

INVENTOR
DALE H. HANSEN
BY
*Nimow & Frater*
ATTORNEYS

METHOD FOR MEASUREMENT OF SCATTER AND ABSORPTION OF LIGHT

This invention relates to methods and means for determining losses in mirrors.

The optical characteristic of a mirror is defined by specifying what portion of incident light is transmitted through the mirror, what portion is reflected by it, and what portion is lost by absorption and what portion is lost by scattering. While the transmissivity of a mirror is readily determined by direct measurement, reflectivity is less easily measured and is best measured indirectly. Loss cannot be measured directly. It is an object of the invention to provide a means by which reflectivity and losses, both absorptive and scattering losses, can be accurately determined. Another object is to provide a method by which those characteristics may be determined automatically in a preprogrammed computer system whereby mirrors can be accurately, rapidly, and inexpensively characterized and evaluated and inspected.

It is a specific object of the invention to provide a method which can utilize high speed electronic and mechanical computing devices. This object is realized, and it is possible to practice the invention, using existing computers both of the analog and the digital types. However, the rate of mirror production and the need for evaluation may not be sufficiently great to warrant devoting a computer exclusively to practicing the method. Accordingly, another object of the invention is to provide a method in which the computing steps may be accomplished after, rather than intermediate to, those steps which require testing and manipulation of the test mirrors. While automatic computation in a preprogrammed computer is preferred, one of the advantages of the invention is that the computations can be made by hand in the absence of a computer or to verify that the computer is performing accurately.

These and other objects and advantages of the invention, which will hereinafter appear, are realized by a provision of a method in which the transmission characteristics of two or more mirrors are measured individually and in pairs. These measurements are introduced into the computer along with the controlling program. The computer accomplishes the computation according to that program, utilizing the input information, and it provides an output which describes the loss characteristics and the reflectivity characteristics of the mirror, or at least one of those characteristics.

The method requires measurement only of the transmission characteristics of the mirrors singly and in series. In certain instances it requires measurement of the separation between the coated surfaces of the mirrors. Certain of these measurements can be made simultaneously with the computation. However, all of them may be made prior to the computation and the results of measurement stored and subsequently introduced into the computing step.

In the drawings:

FIG. 1 is a schematic diagram of an apparatus embodying the invention which is capable of measuring the transmission characteristic of mirrors individually or in series, of storing those measurements, of plotting measured data and extrapolating curves, of making computations according to a control program, and of displaying the results of those computations;

FIG. 2 is a diagram illustrating the paths of light rays through a pair of mirrors in series;

FIGS. 6 through 11 are diagrams of solution programs employed to accomplish computations in the method by hand or mechanically, using mechanical or electronic digital or analog computing apparatus.

Figure 3:
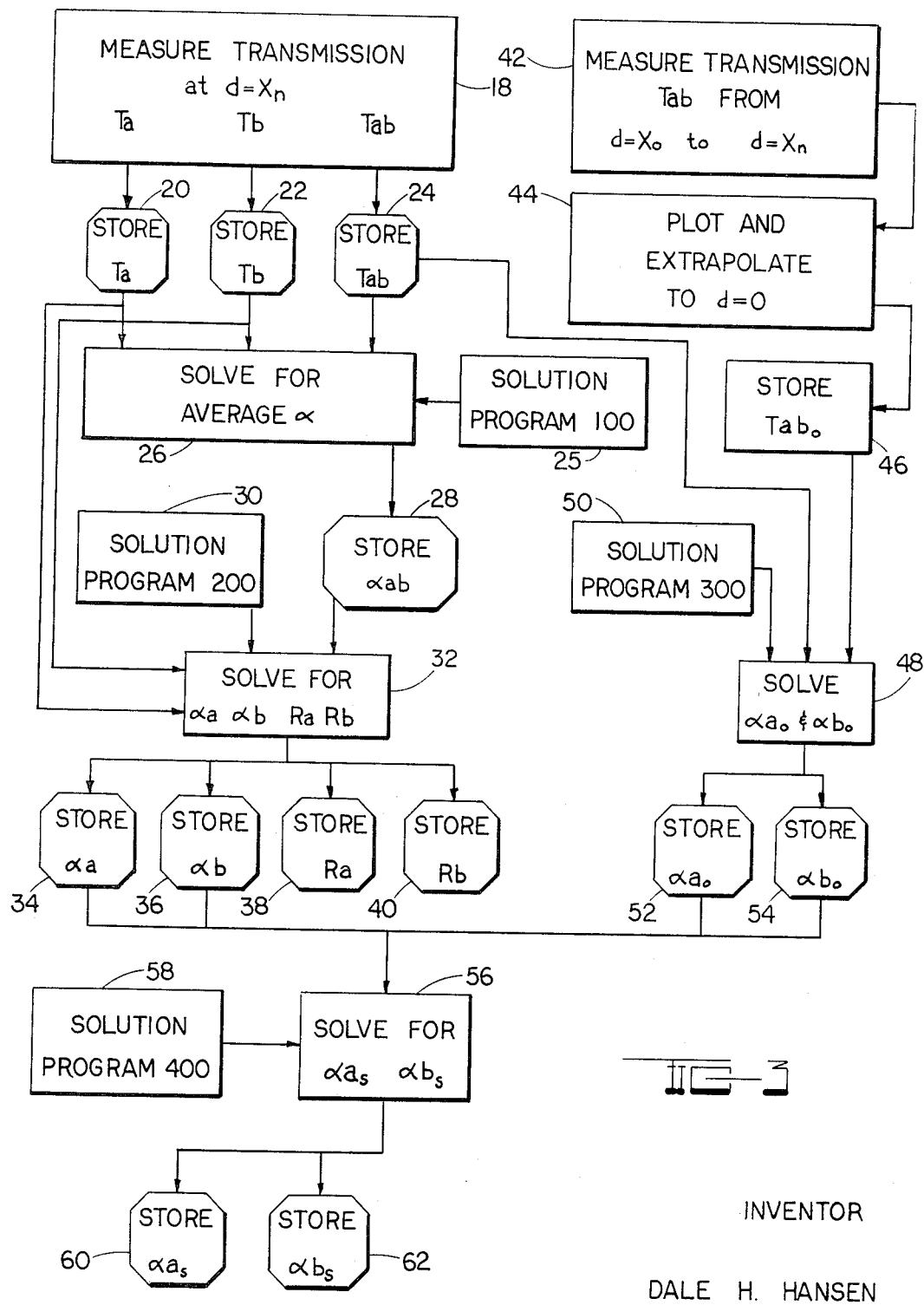
FIG. 3 is a flow diagram illustrating how the average value of loss for a pair of mirrors is determined and how the reflectivity and loss in a pair of similar mirrors is determined.

The law of conservation of energy may be written:

$$l = T + R + \alpha$$

in which $l$ indicates impingement of a unit quantity of light upon a mirror, T is the decimal part of that unit quantity of light that is transmitted through the mirror, R is the decimal part of that unit quantity of light that is reflected from the mirror, and $\alpha$ is that decimal part of the unit quantity of light which is lost by absorption and/or by scattering. In the discussion that follows, $\alpha$ denotes that portion of loss that is accounted for by absorption. The symbol $\alpha_s$ means loss due to scattering. Examples of the invention will involve the use of three mirrors designated $a$, $b$ and $c$. The transmission characteristics of these three mirrors are designated by the symbols $T_a$, $T_b$ and $T_c$, respectively. The reflectivity of those three mirrors is represented by the symbols $R_a$, $R_b$ and $R_c$, respectively. Similarly, the total loss in those several mirrors is designated $\alpha_a$, $\alpha_b$, and $\alpha_c$, respectively. The absorptive loss in mirror a is designated $\alpha_a$. The scatter loss in mirror b is given by the symbol $\alpha_{bs}$. The transmission through the series combination of mirrors $a$ and $b$ is represented by the symbol $T_{ab}$. The symbols applicable to the other mirrors and mirror pairs can be found by analogy.

The interrelationship between the variables, in the mathematical expressions that define the optical characteristics of mirrors, is not complex and is easily within the capabilities of existing computers to calculate completely and accurately. Computer technicians and programmers are easily capable of constructing and operating computers to solve expressions of the relationships which are developed in the following paragraphs. The ability of those computers to make computations according to a prearranged solution program is coupled in the invention with preparing that program in a form that requires the introduction only of accurately measurable data using mirrors which are substantially identical in physical characteristics and, therefore, in their optical characteristics.

Referring to FIG. 2, if a unit quantity of light is transmitted from source P as a ray which impinges upon mirror 10, passing through its substrate 12 to its reflective coating $a$, a portion $T_a$ will be transmitted through the reflective coating $a$ and a portion $R_a$ will be reflected from it. The transmitted portion $T_a$ proceeds until it impinges upon the reflective coating b of mirror 14. A portion of the transmitted $T_a$ of the ray is transmitted in part through the reflective coating b to pass through the substrate 16 and out of the mirror 14. Another part of the transmitted portion $T_a$ of the original a ray will be reflected from coating b, and that part is designated $T_a R_b$. As illustrated in FIG. 2, the original ray is partly reflected and partly transmitted at its first intersection with the mirror coating. The reflected portion is either transmitted or reflected. That portion that is reflected is reflected in part and transmitted in part, the reflected part itself being reflected or transmitted at the next intersection. That process is repeated until the quantity of light remaining after many reflections is so small as to be insignificant in the computation. The quantity of light at each reflection and transmission is expressed mathematically in FIG. 2. All of the light that passes through the second mirror is collected and gathered at point X. That portion of the original unit quantity of light T that arrives at point X is designated $T_{ab}$. That quantity of light that would arrive at point X if the mirror 14 was removed is designated $T_a$. That quantity of light which would arrive at point X if the mirror 10 was removed, without removal of mirror 14, is designated $T_b$. The quantities $T_a$, $T_b$ and $T_{ab}$ are easily measured using an optical bench as illustrated in FIG. 1.

The invention makes use of the solution program expressions of FIGS. 6 through 11. Their accuracy is demonstrated in the following development An expression for the quantity of light $T_{ab}$ can be found by adding the light emanating from the second mirror in FIG. 2. That expression is given as follows:

$T_{ab} = Ta\ Tb + Ta\ Tb\ Ra\ Rb + Ta\ Tb\ Ra^2\ Rb^2 + Ta\ Tb\ Ra^3\ Rb^3 + \cdots + Ta\ Tb\ Ra^N\ Rb^n$. Serial No. 81,660

EXHIBIT A

Define: $T_x = (T_a T_b)^{1/2}$; and $R_x = (R_a R_b)^{1/2}$.
Then: $T_{ab} = T_x^2 (1 + R_x^2 + R_x^4 + R_x^6 + \cdots + R_x^{2n})$.
As $n$ approaches infinity, $T_{ab} = T_x^2 / (1 - R_x^2)$
Substitute $R_x = 1 - T_x - \alpha_x$.
Then: $T_{ab} = T_x^2 / [1 - (1 - T_x - \alpha_x)^2]$.
Rewriting: $(T_x + \alpha_x)^2 - 2(T_x + \alpha_x) - T_x^2 / T_{ab})^{1/2}$
Applying the binomial theorem: $(T_x + \alpha_x) = 1 \pm (1 - T_x^2 / T_{ab})^{1/2}$. The positive of the radical describes a condition which is physically impossible. The negative radical is chosen.
Solving: $\alpha_x = 1 - T_x - (1 - T_x^2 / T_{ab})^{1/2}$
Substituting $(T_a T_b)^{1/2} = T_x$ $\alpha_x = 1 - (T_a T_b)^{1/2} - (1 - T_a T_b / T_{ab})^{1/2}$ where $\alpha_x$ represents the loss expressed in terms of transmission and reflection in each of two like mirrors in tandem.

EXHIBIT A

The general form of this expression is written $\alpha_{12} = 1 - (T_1 T_2)^{1/2} - (1 - T_1 T_2 / T_{12})^{1/2}$
where $\alpha_{12}$ is the average loss for the two mirrors. and this expression is defined as solution program 100 in FIG. 6.

Measurement of the transmission of light through the mirrors individually and in series will yield accurate transmission data if the mirrors are placed so that the reflective coatings face one another and if the substrates are reasonably clean and clear with parallel faces. The assumption that the optical characteristics of the two mirrors are substantially identical can be made without material error if the mirrors are substantially identical in their physical dimensions and if the substrates were made at the same time or under like conditions and if they were coated in the same process. The separation between the mirrors when they are measured in series should be at least several wavelengths as indicated by the symbol $D = X_n$.

Referring to the method of FIG. 3, the quantities $T_a$ and $T_b$ and $T_{ab}$ are measured in step 18. $T_{ab}$ is measured at mirror separation equal to $X_n$ which means a distance greater than a few wavelengths. The measurements are made and the results are stored as indicated at blocks 20, 22 and 24 in FIG. 4. Next, a computation is made to find the average loss for the two mirrors, a and b. This is done in a step designated 26 in a computer which utilizes the information $Ta$, $Tb$ and $Tab$ and is controlled in step 25 by a solution program 100. The solution found by the computer is stored, as indicated by block 28, as the loss $\alpha ab$. Using the same computer, or another, a computation is made as indicated by block 30 for the loss in the individual mirrors, and for reflectivity in the individual mirrors. The computation is made utilizing the stored information at blocks 20, 22 and 28 and by controlling the computer at block 32 with the solution program 200 which is shown in FIG. 7.

Since the average loss for the two mirrors is $\alpha\ 12$ or $\alpha$ one and since the two mirrors are assumed to have like optical properties, $\alpha\ 1 = \alpha\ 2 = \alpha\ ave$; and from the conservation of energy law $R1 = 1 - T1 - \alpha 1$.

The output of the computation step 32 is stored as indicated in blocks 34, 36, 38 and 40. The transmission, reflectivity, and loss in the coating a are identified in blocks 20, 38 and 34, respectively. The optical characteristics transmission, reflectivity, and loss of the coating b, are stored in blocks 22, 40 and 36, respectively.

It remains to separate the loss into its absorbed and scattered components The scattered light is lost by being "walked" by multiple reflections out of the space between the two mirrors. The amount of that loss is reduced as the spacing between the mirrors is reduced. It becomes zero when the spacing between the mirrors is absolutely zero. This condition is difficult to reach physically but data, taken at different degree of mirror separation near the point of zero separation, can be extrapolated to find the zero separation loss. That loss is presumably entirely loss by absorption. Substrating that loss from total loss provides the value of loss by scatter than can be expected when the mirror is separated from another reflective surface by more than several wavelengths.

The method is illustrated in FIG. 3 at the right. Block 42 represents the step in which the transmission through the mirrors a, b, in series is measured at a number of different degrees of separation from $X_0$ to $X_n$. The task is to extrapolate to determine the value of $T_{ab}$ when the distance d equals 0. This can be done by computation or it can be done by plotting the data gathered in step 42 on a graph whose coordinates are $T_{ab}$ and d. Measurements are taken to a very small value or separation. The rate of change of slope of the curve is measured in the vicinity of that point and the curve extended to zero separation with a corresponding rate of change of slope. Intersection of the locus of graph points with the $d=0$ line is identified and stored. The plotting method is illustrated in FIG. 3 by block 44 and the storage step at block 46. Computers and their peripheral apparatus are capable of practicing the method either by use of the graphical or the computation step. However, the graphical method is simpler in the case of computation by hand and when hand methods are used to verify computer results. Accordingly, the graphical method is preferred and is illustrated in FIG. 3.

Utilizing the value of $T_{ab}$ stored at block 24 and the value of $T_{abo}$ stored at block 46, a computation is made at block 48 according to the solution program instructions 300 which are applied at block 50 to control computer operation at block 48. The output of that computation yields absorption loss in mirrors $a$ and $b$. The calculated values are stored as indicated in blocks 52 and 54, respectively. The information there stored is combined with total loss information for mirror $a$ and for mirror $b$ which is stored in blocks 34 and 36, respectively. They are combined to accomplish a computation, block 56, in accordance with solution program 400 which has been stored at block 58. The result of the computation at step or block 58. The result of the computation at block 56 is to subtract absorption loss from total loss in the two mirrors to find the quantities, scatter loss for mirror $a$ and scatter loss for mirror $b$. These quantities are stored as indicated at steps 60 and 62, respectively.

The solution program 300 is based on two considerations. First, since neither reflection nor transmission of light through the mirrors is affected by the mirror spacing, the apparent difference between the transmission when the mirrors are spaced and when they are not is accounted for entirely by the fact that light, which is free to scatter when the mirrors are separated, cannot be scattered and must be transmitted when the spacing is zero. Hence, a scatter loss for the two mirrors is equal to the measured difference in transmission. It can be demonstrated that the loss in the system thus determined is equal to the loss in each of the two mirrors.

Solution program 400 is simply a statement that the loss by scatter is the difference between total loss and the loss by absorption.

Figure 4:
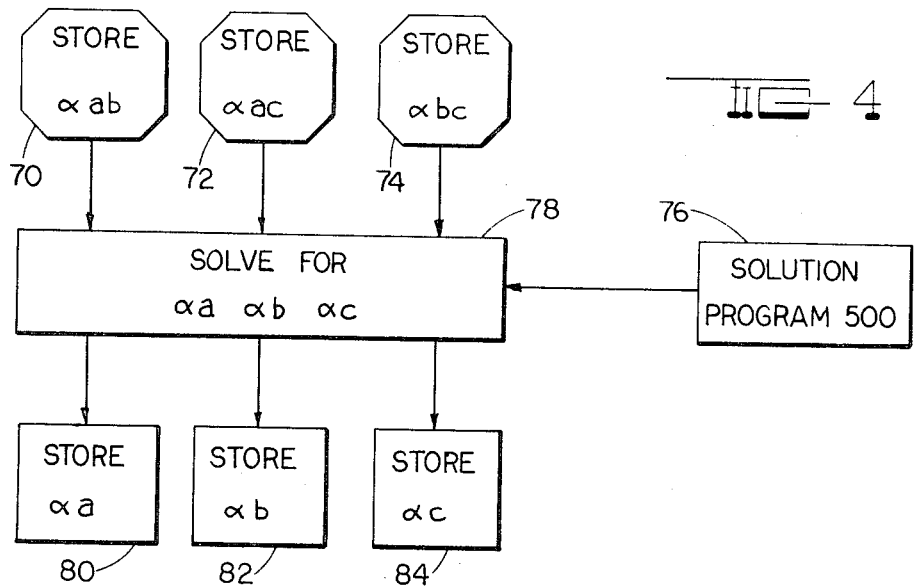
FIG. 4 is a diagram illustrating how the specific loss for three mirrors is specified when the average loss for the mirrors in pairs has been specified as by the method illustrated in FIG. 3.

FIG. 4 illustrates the steps involved in determining the loss in each of three mirrors. Steps 18, 20, 22, 24, 25, 26 and 28 of FIG. 3 describe how to determine and store information about the loss characteristic of a pair of mirrors. Using those steps of the method of FIG. 3, the loss is determined and stored for each combination of the three mirrors taken two at a time and the determination is stored as indicated in FIG. 4. The loss characteristic of mirror pair $ab$ is stored in step 70 and the loss characteristic of mirror combination $ac$ is stored at step 72. Finally, the loss characteristic of the combination of mirrors $b$ and $c$ is stored in step 74. The information stored in these steps is applied to a computer which is controlled in step 76 by solution program 500. The computer solves, in step 78, for the loss in each mirror. The loss in mirror $a$ is stored at step 80 whereas the loss in mirrors $b$ and $c$ are stored in steps 82 and 84, respectively. These losses, which were considered to be equal for the several mirrors in establishing the calculation procedure, are separately calculated at this step and any small difference is determined.

Referring to FIG. 10, the solution program 76 is simply a control program to make the computer solve three equations by simultaneous solution methods. Using this method, the loss components of the three mirrors can be separated working with the mirrors in pairs. Doing that for all three combinations of mirrors results in an expression that can be solved simultaneously using solution program 500 and the method illustrated at the right in FIG. 3.

Figure 5:
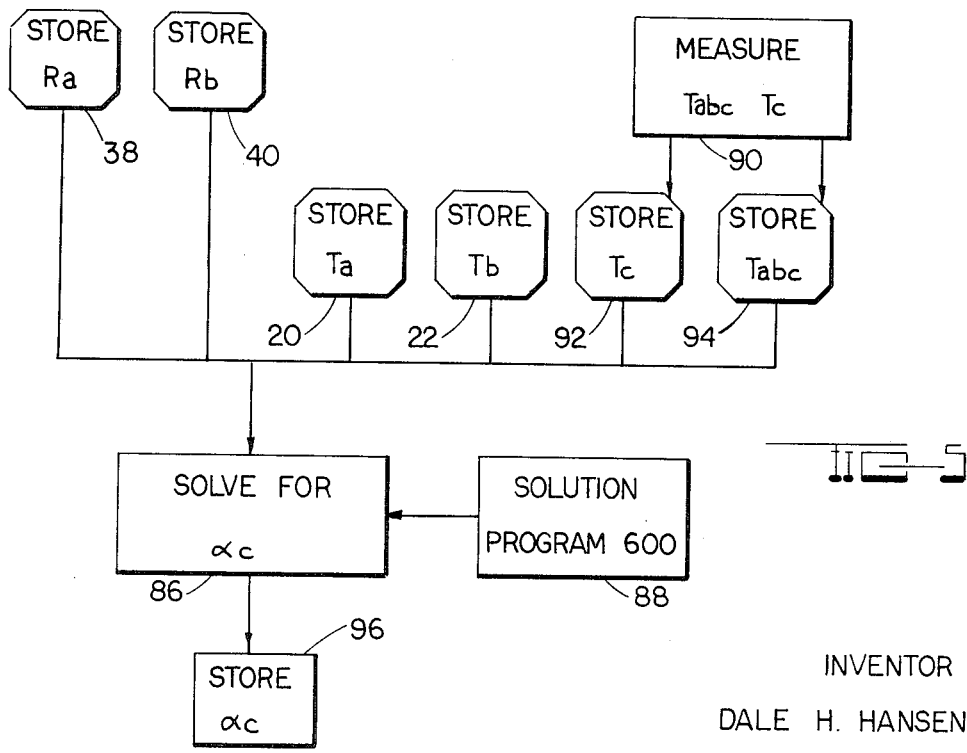
FIG. 5 is a diagram illustrating the steps in computing the loss of a third mirror if the transmission and reflectivity characteristics of two other mirrors are known.

An extension of the methods of FIG. 3 and FIG. 4 is illustrated in FIG. 5. The method of that figure involves a computation step 86 which relies on a control step 88 in which the computation is controlled by a solution program 600 shown in detail in FIG. 11. The characteristics of three mirrors can be determined by measuring their individual transmission characteristics and the transmission characteristic of all three of them in series. The method can be used to determine the characteristics of three unknown mirrors. Ordinarily, however, the method would be practiced using two mirrors whose characteristics were known. The embodiment of that method illustrated in FIG. 5 assumes that mirrors $a$ and $b$ are specified and that their transmission had been determined and stored in steps 20 and 22 of the method of FIG. 3, and that their reflectivity had been determined and stored in steps 38 and 40 of FIG. 3. With that information available, mirrors $a$, $b$ and $c$ are placed in series and their transmission characteristic measured. Also, mirror $c$ has its transmission characteristic measured alone. All this is accomplished in step 90 of FIG. 5. Information about the transmission characteristic of mirror $c$ is stored at step 92 and information about the transmission characteristics of all three mirrors in series is stored at step 94. Information about the characteristics $Ra$, $Rb$, $Ta$, $Tb$, $Tc$ and $Tabc$ are fed into the computer for computation in step 86 under the control of solution program 600 in a step 88. The computation yields the value of loss in mirror $c$ which is stored in a step 96.

Figure 12:
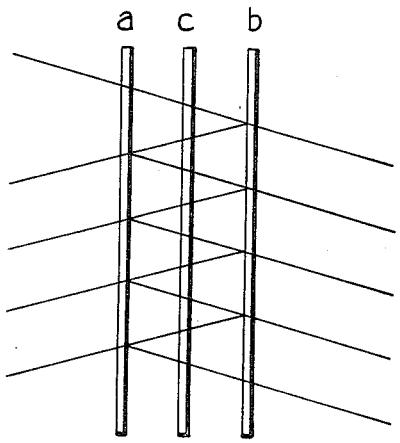
FIGS. 12, 13 and 14 are diagrams depicting how a light ray is transmitted and reflected by each pair of mirrors in a system of three mirrors in tandem.
Figure 13:
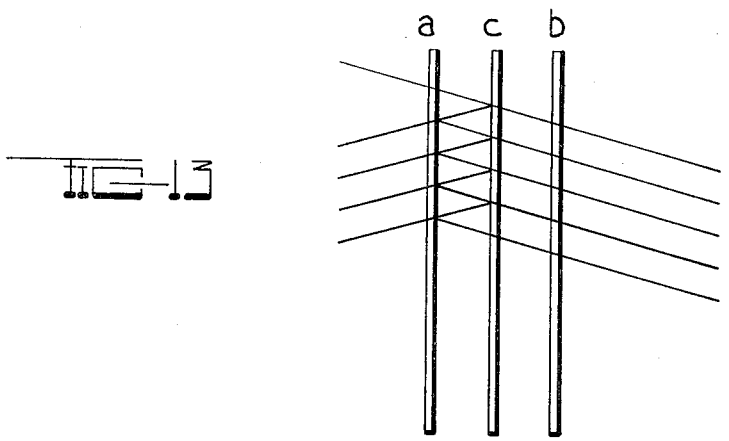
Figure 14:
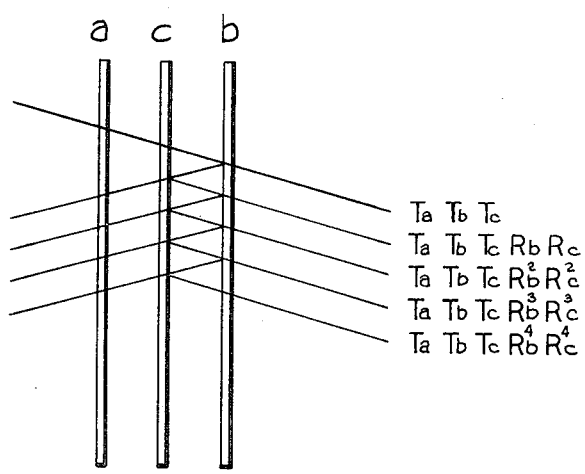

That the solution program 600 can control the computer to calculate loss in mirror 3 can be demonstrated by examination and analysis of figures, the mirrors are illustrated by showing only their reflective surfaces. The substrates are omitted. FIG. 12 considers only that light from source p which bounces between the reflective coatings $a$ and $c$. FIG. 13 considers only that light which bounces between reflective surfaces $a$ and $c$. Finally, FIG. 14 considers only that light that bounces between reflective surfaces $b$ and $c$. There being no other light path through the system, these three figures describe the total possible light flow from source p through the three mirrors. That portion of the total light which is accounted for in FIG. 12 is given by the following expression:

EXHIBIT B $T_A = T_a T_b T_c (1 + T_c^2 R_a R_b + T_c^4 R_a^2 R_b^2 + T_c^6 R_a^3 R_b^3 + T_c^8 R_a^4 R_{an}^4 + \text{----})$ Similarly:
$T_B = T_a T_b T_c (1 + R_a R_c + R_a^2 R_c^2 + R_a^3 R_c^3 + \text{-----})$ Similarly:
$T_C = T_a T_b T_c (1 + R_b R_c + R_b^2 R_c^2 + R_b^3 R_c^3 + \text{----})$ The light may bounce in such a manner as to give all combinations at any transmission or reflection of all three kinds of light flow. Accordingly, the expression for total light flow $T_T$ is given by the product:

$$T_T = T_A T_b T_C.$$

Substituting:
$T_T = (T_a T_b T_c/1 - T_c^2 R_a R_b) + T_a T_b T_c [R_c(R_a + R_b) + R_c^2 (R_a^2 + R_b^2) + \cdots] \times [1 + 1/(1 - T_c^2 R_a R_b)]$

EXHIBIT B

Substitute: $R_c = 1 - T_c - \alpha_c$

The result of that substitution yields an expression which can be solved by a reiterative process to yield the expression for loss in the third mirror which is the solution program 600 of FIG. 11.

An apparatus suitable for practice of the method is illustrated in FIG. 1. An optical bench 100 includes a light source p and and optical system 102 by which light can be directed toward mirrors a, b and c so that light transmitted through those mirrors is collected and filtered in an optical system 104 and directed to a photomultiplier tube 106, the output of which is applied to a data storage unit 108. All of the storage steps of the methods described above are accomplished in that apparatus. Actual data storage can be on magnetic tape or in punched cards or in any other conventional form by which it may be applied to the computer 110. Output of the computer sends data back to the storage unit 108 for reuse in other steps. The programs 100, 200, 300, 400 and 500 are stored in an apparatus 112 which has a form appropriate to the form of the computer 110. The program can be in the form of prewired circuit boards or in the form of punched cards which, by their arrangement of holes, control the electrical behavior of the computer. The plotter 114 is associated with the computer so that it can receive its computations and make its extrapolation and return information to the computer. The three mirrors a, b, and c are removable mounted upon sample holders 120, 122 and 124, respectively. The holders, and the mirrors mounted upon them, are movable to change the spacing between their respective reflective coatings.

I claim:

1. The method of determining the loss in mirrors which comprises the steps of:
   measuring the transmission through similar mirrors individually and measuring transmission through said mirrors in series with their reflective surfaces spaced by more than a few wavelengths;
   storing the measurements thus made;
   computing the average loss of said mirrors using said stored measurements; and
   computing the loss for each of said mirrors.

2. The invention defined in claim 1 which comprises the further step of measuring the transmission through said mirrors in series at several different spacings;
   extrapolating to find transmission through said mirrors at zero spacing; and
   computing the average loss for said mirrors at zero spacing.

3. The method defined in claim 2 which comprises the further step of determining scatter loss by subtracting the loss found when mirror spacing was zero from the loss found when the mirrors were spaced.

4. The invention defined in claim 2 in which the extrapolation is accomplished by plotting, finding the rate of change of the curve plotted as it approaches zero separation, extending the curve at that rate of change to the point of zero separation; and
   determining the magnitude of loss at the point at which the curve crosses its zero separation point.

5. The method of finding the loss in a third mirror by using two mirrors which are similar to one another and whose transmission and reflection characteristics are known, comprising the steps of:
   measuring the transmission characteristic of the three mirrors in series;
   measuring the transmission characteristic of the third mirror; and
   using the said known and measured characteristics, computing the loss in said third mirror.

6. The invention defined in claim 5 which comprises the further step of measuring average transmission characteristic through each pair of said three mirrors;
   using said average transmission characteristic, solving for average loss in each of said pairs; and
   using average transmission loss in each pair, solving simultaneously for actual loss in each mirror.

7. The method of ascertaining the loss characteristic in a test mirror which comprises the step of measuring the transmission through the test mirror and two additional mirrors, and storing the measurements made;
   measuring the transmission through all three mirrors and through all three combinations of pairs of the mirrors at given spacing between mirrors and storing the measurements made; and
   using the stored measurements and simultaneous equation solution procedures, solving for total loss in the test mirror.

8. The invention defined in claim 7 which comprises the further steps of:
   solving for total loss in said two additional mirrors;
   measuring transmission through said pairs of mirrors at other spacings;
   extrapolating to find transmission through each pair of mirrors at zero spacing;
   solving for loss in the test mirror at zero spacing using the extrapolated values of transmission characteristic in simultaneous equation solution procedures.

9. Apparatus for determining the loss characteristic of mirrors with the aid of a computer capable of solving the equations according to a solution program when furnished with input data, comprising:
   a light source;
   means for arranging at least two mirrors in series and individually in the path of light emanating from said source;
   means for measuring the quantity of light arriving at said mirrors and for measuring the amount of that light that is transmitted through mirrors arranged in said path; and
   means for storing the measurements made.

10. The invention defined in claim 9 which further comprises means for extrapolating plotted data including means capable of drawing the curve of transmission characteristic against mirror separation between measured data points;

said means for extrapolating plotted data further including means for extending the curve to zero separation and determining the plotted value of transmission characteristics at zero separation.

* * * * *